US012812204B2

(12) United States Patent
Jackson et al.

(10) Patent No.: US 12,812,204 B2
(45) Date of Patent: Nov. 24, 2026

(54) METHOD AND SYSTEM FOR DYNAMICALLY-SCALING ANIMATIONS WITHIN MEDIA EDITING

(71) Applicant: Adobe Inc., San Jose, CA (US)

(72) Inventors: Tana Jackson, Sunnyvale, CA (US); Michelle Gutierrez, Seattle, WA (US); Kriti Sharma, San Jose, CA (US); Emma Siegel, San Francisco, CA (US); Josh Adams, St. Louis Park, MN (US); Peter Garaway, Concord, CA (US); Tim Gogolin, Vadnais Heights, MN (US); Tom Mahieu, Seattle, WA (US); Mark Mapes, Carmichael, CA (US); Yolanda Xiao, Seattle, WA (US); Lisa Boghosian, Oakland, CA (US)

(73) Assignee: ADOBE INC., San Jose, CA (US)

( * ) Notice: Subject to any disclaimer, the term of this patent is extended or adjusted under 35 U.S.C. 154(b) by 224 days.

(21) Appl. No.: 18/911,142

(22) Filed: Oct. 9, 2024

(65) Prior Publication Data

US 2026/0101085 A1 Apr. 9, 2026

(51) Int. Cl.
*G06F 3/01* (2006.01)
*H04N 21/431* (2011.01)
*G06F 3/00* (2006.01)

(52) U.S. Cl.
CPC ..... *H04N 21/4318* (2013.01); *H04N 21/4312* (2013.01)

(58) Field of Classification Search
None
See application file for complete search history.

(56) References Cited

U.S. PATENT DOCUMENTS

| | | | | |
|---|---|---|---|---|
| 9,888,168 | B2 * | 2/2018 | Chun | G06F 3/04883 |
| 10,372,306 | B2 * | 8/2019 | Pendergast | G11B 27/34 |
| 10,496,689 | B2 * | 12/2019 | Kim | G06F 16/35 |
| 11,550,452 | B1 * | 1/2023 | Fortunato | G11B 27/031 |
| 11,665,312 | B1 * | 5/2023 | Brandt | G06F 3/04817 715/725 |
| 2012/0210217 | A1 * | 8/2012 | Abbas | G06F 16/113 715/716 |
| 2012/0210230 | A1 * | 8/2012 | Matsuda | G06F 3/04847 715/723 |
| 2013/0124998 | A1 * | 5/2013 | Pendergast | G11B 27/34 715/723 |

(Continued)

*Primary Examiner* — Toan H Vu
(74) *Attorney, Agent, or Firm* — Polsinelli LLP

(57) ABSTRACT

A media editor receives a set of media segments that make up a media presentation. The media editor organizes the set of media segments into a presentation sequence. The media editor identifies one or more editing operations applied to a particular media segment. The one or more editing operations transform the media segment from a first media type to a second media type. The media editor defines a scaling parameter for the particular media segment based on a presentation length of the particular media segment relative to a presentation length of one or more other media segments. The media editor normalizes the one or more editing operations based on the scaling parameter and executes the normalized one or more editing operations on the particular media segment. The media editor then facilitates a presentation of the set of media segments of the media presentation.

20 Claims, 5 Drawing Sheets

(56) References Cited

U.S. PATENT DOCUMENTS

| | | | | |
|---|---|---|---|---|
| 2019/0066731 | A1* | 2/2019 | Jarrell | G11B 27/34 |
| 2020/0034624 | A1* | 1/2020 | Sharma | G06F 3/011 |
| 2020/0363947 | A1* | 11/2020 | Ikuta | G06F 3/04883 |
| 2024/0129355 | A1* | 4/2024 | Shaffer | G06F 21/32 |
| 2024/0361898 | A1* | 10/2024 | Ardaud | G06F 3/04847 |

* cited by examiner

METHOD AND SYSTEM FOR DYNAMICALLY-SCALING ANIMATIONS WITHIN MEDIA EDITING

TECHNICAL FIELD

This disclosure relates generally to media editing systems, and more particularly to dynamically scaling of editing operations within media editing systems.

BACKGROUND

With improvements to modern mobile computing (e.g., smartphones, tablets, etc.) such as high-resolution cameras and processing resources, mobile devices are capable of capturing and processing high quality media (e.g., images, audio, video, etc.). Media editing systems then process the raw, captured media transforming the raw media into a polished media presentation. The editing systems can tailor the raw media to a particular creative goal. For instance, color correction can adjust the color of media segment to black and white to increase a dramatic effect or to one or more bright colors (e.g., colors with a high saturation and lightness, etc.) to invoke a particular emotion. The editing system can apply other editing processes (e.g., such as media selection, upscaling or downscaling resolutions, compression, audio processing, etc.) for a similar impact.

SUMMARY

Media editing systems provide for the capturing, generation, and editing of various types of media. Some media includes as a set of discrete media segments (e.g., images, video, audio, combinations thereof, and/or the like) organized into a sequence. During editing, a media editing system applies various processing operations to the media by modifying individual media segments and/or the set of discrete media segments as a whole. When applying processing operations to individual media segments, the media editing system scales the media editing systems to normalize the impact of the processing operations relative to other media segments of the media. For instance, the media editing system defines a feature, such as time, that characterizes the media segment relative to other media segments of the media. The media editing system then scales the editing operations based on the feature so that executing the media processing operation on the media segment modifies the media segment similarly to other media segments of the media.

The methods, systems, and non-transitory computer-readable media and systems described herein include various media editing systems and operations as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
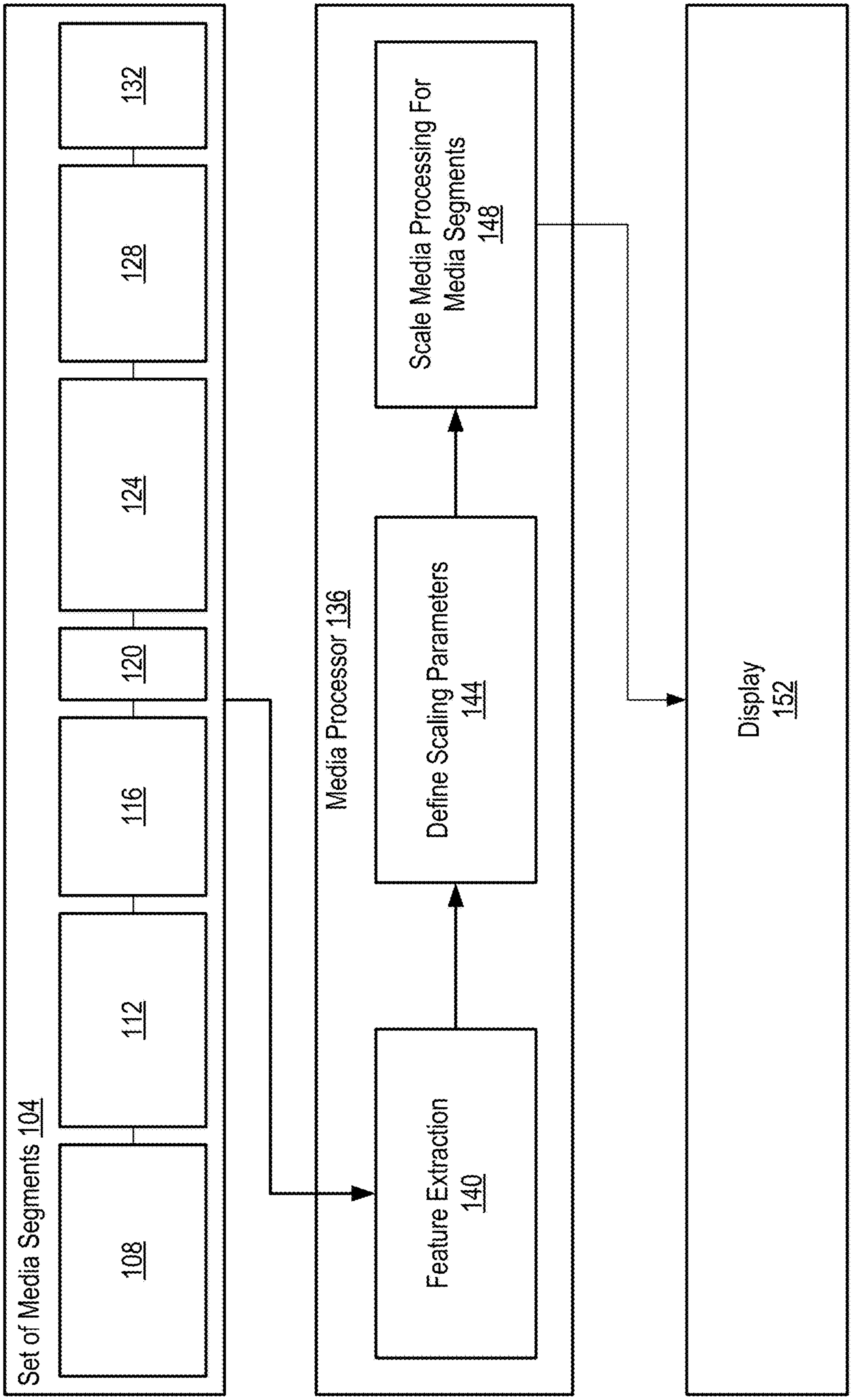
FIG. 1 illustrates a block diagram of an example media editing system that scales editing operations based on features extracted from media segments according to aspects of the present disclosure.

Methods and systems are described herein for scaling editing operations within processing systems. While there are conventional techniques for editing media, such conventional techniques do not scale according to the particular characteristics of individual media segments within the media. For example, a media processing system generates a media presentation from a sequence of media segments, such as images, presented over varying time intervals. An editing operation executed on the images generates a zoom effect over the time interval of each media segment. Conventional techniques execute the editing operation on each media segment uniformly and regardless of the varying time intervals of each media segment. As a result, the zoom effect appears faster in shorter media segments and the zoom effect appears slower in longer media segments. Other editing operations are executed similarly on the media as a whole rather than based on the particular characteristics of the individual media segments within the media. The uneven impact of the editing operations is inefficient (e.g., consumes excessive processing resources when applied to media segments that do not conform to the mean) and introduces visual artifacts that impact the appearance and presentation of the media.

The methods and systems described herein address the aforementioned problems by defining features of a media segment relative to features of other media segments and normalize the editing operations by scaling the editing operations based on the defined features. The scaled editing operations improve the processing of the media segments and the appearance of the media by reducing visual artifacts and/or other issues that impact the presentation of the media.

A media editing system of a computing device (e.g., such as a computer, mobile device such as a smartphone or tablet, server, etc.) includes a control interface for accessing functions of the media editing system such as functions that define new media, edit media, manage media, and/or the like. For example, a control interface receives input from a user to define new media from one or more media segments (e.g., one or more images, video segments, audio segments, combinations thereof, and/or the like). The control interface receives the media segments from a camera of the computing device, local or remote memory, and/or from one or more other devices. The control interface receives a selection of the one or more media segments to package into the new media. The controller interface then defines a presentation sequence for the one or more media segments. The control interface also defines a presentation length for each media segment. The presentation length of a media segment corresponds to the amount of time in which the media segment is presented. The control interface defines the presentation length according to a real number or a condition that when satisfied causes the presentation of the media to transition to a subsequent media segment.

For instance, for images or other temporally-static media, the control interface defines a presentation length, which converts a presentation of the images or temporally-static media into temporally-dynamic media that the media editing system presents over a time interval corresponding to the presentation length. In some examples, the new media includes additional media presented during the new media such as music. The control interface analyzes the additional media and defines conditions that trigger a transition to a subsequent media segment. For instance, the control interface defines a condition for a first media segment to transition to a second media segment on a beat of the music.

The control interface defines one or more editing operations that modify the presentation of the new media and/or any media segment thereof. Examples, of editing operations include, but are not limited to, translations, color corrections, zoom effects, adding or removing animations, adding or removing audio, transition effects between media segments, combinations thereof, and/or the like.

For instance, the control interface executes a media processing operation to add an animation effect to an image media segment. The control interface defines a series of translations of the image that when presented create motion within the image such as a zoom effect over the presentation length. Each translation corresponds to a representation of a portion of the image. Zooming in on the image, for instance, removes a portion of the image and executes a translation enlarging and upscaling the remaining portion of the image. Zooming out is the reverse of the zooming in process.

The quantity of translations that define the animation effect are similar for each media segment causing the presentation of the media segment to vary based on the presentation length of each media segment. For instance, given a first media segment that is shorter than a second media segment, the series of translations of the first media segment will be presented over a shorter time interval than the series of translations of the second media segment. This causes the animation effect to be presented at a faster rate than the animation of the second media segment.

The control interface corrects for the inconsistent presentation of media segments by scaling the editing operations for individual media segments based on features of the media segments relative to other media segments. Modifying the editing operations enables defines a uniform and efficient presentation of the media segments relative to other media segments of the media. In some examples, the control interface modifies a media processing operation by extracting features from each media segment. A feature represents characteristics of media segments such as presentation length, color information, frequency information (e.g., such as pixel frequency information, audio frequency information, etc.), resolution, frame rate, refresh rate, an identification of the media processing operation, and/or the like. The control interface defines a scaling parameter for each feature or for one or more features. In some examples, the control interface defines the scaling interface by comparing each feature to a corresponding feature of other media segments. In some examples, defines the scaling interface by comparing the feature to an average value of the feature. In some examples, the defines the scaling interface by comparing each feature to a corresponding feature of a subsequent media segment in the sequence. The control interface uses the scaling parameter to modify the media processing operation for a media segment.

For instance, the control interface extracts a presentation length from a first media segment and from each other media segment of the media. The control interface defines a scaling parameter using the presentation length of the first media segment and the average presentation length of each media segment of the media. The control interface then using the scaling parameter to modify a media processing operation that applies, for example, an animation effect. The control interface applies the media processing operation to the first media segment to normalize the presentation of the first media segment relative to other media segments of the media. For instance, scaling the media processing operation increases or reduces the quantity of translations of the animation effect to cause the presentation of the animation to appear at a similar or same rate as the animation effect applied to other media segments of the media.

In some examples, the control interface scales the editing operations for each media segment relative to the media as whole (e.g., using an average of a feature of each media segment, a global feature associated with the media as a whole, etc.). This causes the modified media processing operation to cause a similar or same effect in each media segment for which the editing operations is applied. In other examples, the control interface scales the editing operations for each media segment relative an immediately previous and/or subsequent media segments in the presentation sequence of the media (e.g., using a feature of the immediately previous and/or subsequent media segments). This causes the modified media processing operation of a first media segment to impact the first media segment relative to the immediately previous and/or subsequent media segments (e.g., regardless of other media segment of the media).

The methods and systems described herein improve the generation and editing of media composed of media segments. Scaling editing operations enables the uniform application of the editing operations across media segments. For example, scaling an editing operation applying a zoom effect to media segments causes the zoom rate to be similar or the same for each media segment. Thus, scaling editing operations avoids introducing audiovisual inconsistencies when editing media segments with varying characteristics. The methods and systems described herein improve media editing and the appearance and presentation of the overall media.

FIG. 1 illustrates a block diagram of an example media editing system that scales editing operations based on features extracted from media segments according to aspects of the present disclosure. A media editing system receives input defining new media composed of set of media segments 104. Each media segment corresponds to media configured to be presented over a time interval of the media (e.g., referred to as the presentation length) such as an image, video segment, audio segment, combinations thereof, and/or the like. Media segments 108-132 of set of media segments 104 include different features such as, but not limited to, presentation length, source, color characteristics, frame rates, resolutions, metadata, etc. For instance, the media editing system presents media segments for a particular time interval, until a condition is satisfied (e.g., such as a beat of music, characteristics of the media segment being presented, characteristics of a subsequent media segment, etc.), and/or the like.

Media processor 136 of the media editing system executes editing operations on set of media segments 104 and/or the media to improve the presentation of the media. The editing operations include, but are not limited to, reordering media segments of set of media segments 104, modifying a presentation length of media segments, adding or removing animations or graphical elements layered over a media segment, rotating or moving graphical elements layer over media segments, adding or removing music or other audio configured for presentation with media segments and/or the media as a whole, modifying color characteristics of media segments, adding or removing motion or other effects to a media segment (e.g., such as a zoom-in or zoom-out effect, etc.), adding or removing transition effects between media segments, upscaling or downscaling media segments, modifying a framerate of a media segment, combinations thereof, and/or the like.

Since each media segment of set of media segments 104 has different features, operations executed on the media and/or individual media segments impact different media segments differently. For instance, an operation executed on image media segments to convert a presentation of a static image into a presentation of motion within the image by zooming into the image over the presentation length or zoom out of the image over the presentation length. The operation executes one or more translations that define transitions between an initial representation of the image media segment (e.g., a starting representation of the image media segment corresponding) and a zoomed-in representation of a portion of the image media segment (e.g., ending representation of the image media segment) or a zoomed-out representation of the image media segment. The presentation of the modified image media segment differs depending on the presentation of the media segment. For shorter media segments, the zoom in and/or zoom out motion will appear faster than longer media segments.

Feature extraction 140 of media processor 136 identifies features of the media segments of set of media segments 104. A feature represents one or more characteristics of a media segment such as a presentation length, color information (e.g., average pixel color, average frame pixel color per frame, color frequency, etc.), frequency information (e.g., such as audio frequency information, etc.), a source of a media segment (e.g., a device that captured or generated the media segment), a geolocation of where the media segment was captured or generated, user information, a resolution of the media segment, frame rate of the media segment, refresh rate of the media segment, an identification of operations executed on the media segment, and/or the like. In some examples, features extracted by feature extraction 140 include direct features (e.g., features that are observable, features that can be defined from measurements, etc.), derived features (e.g., features defined from one or more direct features, etc.), and/or inferred features (e.g., features defined by user or machine-based reasoning such as a machine-learning model, etc.).

Media processor 136 passes the extracted features to define scaling parameters 144. Define scaling parameters 144 defines derived features from the extracted features of a media segment relative to the extracted features of other media segments of set of media segments 104. The derived features represent relationships between corresponding features extracted from media segments. For instance, define scaling parameters 144 identifies presentation length of each media segment and determines differences between the presentation lengths of each media segment of set of media segments 104, average presentation length based on the quantity of media segments in set of media segments 104, the median presentation length, the mode presentation length, etc. Media processor 136 defines scaling parameters from the extracted features and/or the derived features.

In some examples, media processor 136 defines scaling parameter for each of one or more operations configured to execute on the media and/or set of media segments 104. For instance, media processor 136 includes a definition of one or more operations selected for execution on the media and/or set of media segments 104. Media processor 136 defines scaling parameters for each of the one or more operations. Media processor 136 uses the scaling parameter to modify the one or more operations. In other examples, media processor 136 receives a selection of one or more operations that will be executed on the media and/or set of media segments 104 and defines scaling parameters for only those one or more selected operations. If an additional one or more operations are selected (e.g., during and/or after selection of the initial one or more operations), media processor 136 defines additional scaling factors for the additional one or more operations (e.g., returning to feature extraction 140 and/or define scaling parameters 144).

Media processor 136 passes the scaling parameters to scale media processing for media segments 148. Scale media processing for media segments 148 uses the scaling parameters to modify the operations executed on the media segments. Modifying the operations causes the impact of executing the operation on a segment to be scaled relative to other media segments of set of media segment 104. Media processor 136 modifies the operations by increasing or reducing the individual processes applied by an operation according to the scaling parameter. For instance, an operation to add motion to a static image by causing a zoom-in or zoom-out effect includes one or more translation of the static image. The translations define a sequence of transitions (e.g., one or more frames) from an initial representation of the static image (e.g., an unmodified representation of the static image, a zoomed in representation of the static image, etc.) to a final representation of the static image (e.g., a zoomed in representation of the static image if the initial representation of the static image was unified or a zoomed out representation if the initial representation was zoomed in).

Modifying the operation includes modifying the one or more translations to reduce a distance between the initial representation of the static image and the final representation of the statical image or to increase the distance between the initial representation of the static image and the final representation of the statical image according to the scaling parameter causing a reduction or increase in the zoom rate. Reducing the distance between the initial representation of the static image and the final representation of the statical image reduces a distance in which the static image is zoomed into or zoomed out of, which decreases the duration of the zoom effect. For media segments that are shorter than average, reducing the distance between the initial representation of the static image and the final representation of the statical image reduces the rate of the zoom effect. Increasing the distance between the initial representation of the static image and the final representation of the statical image increases the distance in which the static image is zoomed into or zoomed out of, which increases the rate in which the zoom effect is presented in longer media segments. For media segments that are longer than average, increasing the distance between the initial representation of the static image and the final representation of the statical image increases the rate of the zoom effect.

Media processor 136 executes the scaled operations on the media segments of set of media segments 104. If no additional editing operations are selected, media processor 136 stores set of media segments 104 of the media in memory and passes set of media segments 104 to display 152 for presentation.

Figure 2:
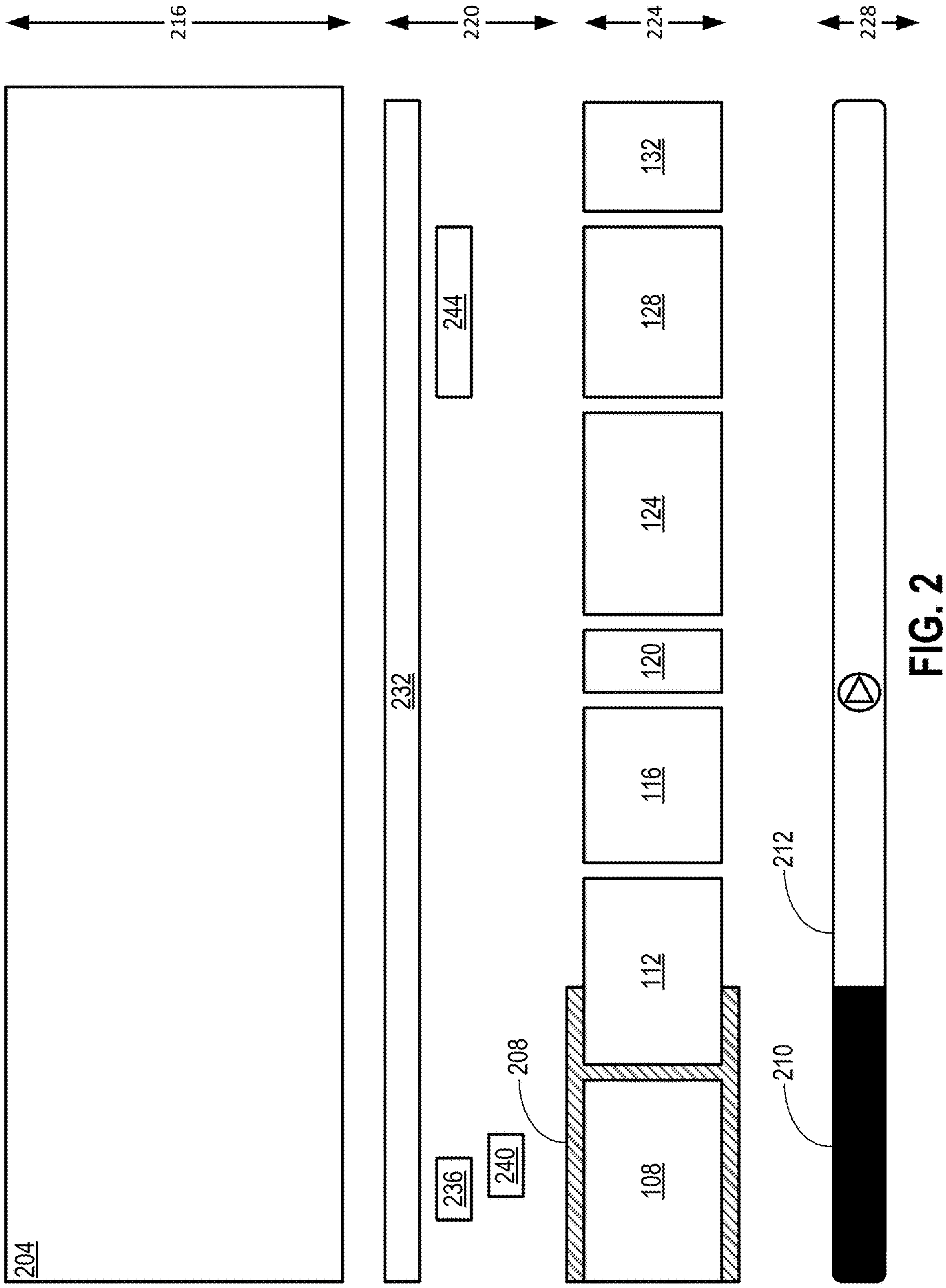
FIG. 2 illustrates a diagram of an example media editing system configured to generate, edit, and/or present media according to aspects of the present disclosure.

FIG. 2 illustrates a diagram of an example media editing system configured to generate, edit, and/or present media according to aspects of the present disclosure. The media editing system executes on a computing device or mobile device (e.g., smartphone, tablet, etc.) to enable generating new media and editing exiting media. The media editing system includes a control interface (e.g., a graphical user interface) that provides graphical representation of media and media segments, and controls configured to execute editing operations on the media and media segments. The media editing system generates new media by accessing media stored in memory of the computing device or mobile device. The media editing system receives a selection of one or more media segments from memory. The media editing system then receives input identifying a presentation order of the one or more media segments. On devices with touch interfaces, the user reorders the media segments touching an area of a touch interface over a media segment and dragging the media segment to a new location. Alternatively, the media editing system loads existing media comprising one or more media segments from memory. The media editing system represents the one or more media segments of the existing media in a presentation sequence. In some examples, the user provides input to reorder the one or more media segments of the existing media as previously described.

Control interface includes one or more regions with each region including controls to modify the media or particular media segments. For example, regions 216-228 each present information relating to the media. Region 216 includes display 204, which displays the media, media segments, and individual frames of media segments. Region 220 includes an element hierarchy representing elements layered onto the media. Region 224 includes a representation of the presentation sequence of media segments. Region 228 includes progress bar 212. Each region is expandable at the expense of one or more other regions of regions 216-228. For instance, selecting display 204 of region 216 causes region 216 to expand and one or more other regions to contract to make room for the expanded form of display 204. In some instances, region 224 and/or region 228 may not contract when another region is selected to enable navigating through the media and/or media segments. The control interface receives input defining the arrangement of regions 216-228. For instance, control interface receives user input selecting a particular region and dragging the region over another region of regions 216-228 causing the selected region to be placed proximate to the other region or switch places with the other region.

Region 216 of control interface includes a display 204 that displays a representation of media being loaded into the media editing system. Control interface includes controls for initiating a presentation (e.g., playback) of the media. Control interface includes a graphical representation of a current portion of the media being presented by display 204. For example, bar 208 provides a representation of a current location of the media that is selected or being presented. Bar 208 appears proximate to a sequence of icons representing media segments 108-132 and moves from left to right (in one example), around the icons representing media segments 108-132. The right-most edge of bar 208 (in this example) represents the current location of the media being presented. The icon of the media segment closest to the right-most edge of bar 208 corresponds to the media segment being presented. Segment 210 of progress bar 212 also provides an indication of the current location of the media being presented. Segment 210 also moves from left to right within progress bar 212 as the media is presented.

Control interface receives input selecting a location within progress bar 212 and adjusts the current portion of the media being presented as the portion of the media that corresponds to the selected location. For instance, control interface receives input selecting a particular portion of progress bar 212 and begins presenting the portion of the media represented by the particular portion of progress bar 212 within display 204. Alternatively, or additionally, control interface receives input dragging segment 210 to the right to advance the media or to the left to rewind the media. Similarly, control interface adjusts the current portion of the media being presented within display 204 through bar 208. For instance, control interface receives input selecting a particular media segment of media segments 108-132 and begins presenting the particular media segment. Alternatively, or additionally, control interface receives input selecting a particular portion of a media segment (e.g., such as a touch interface receiving touch input over a portion of an icon representing a media segment) and begins presented the particular portion of the media segment. Alternatively, or additionally, control interface receives input dragging bar 208 to the right to advance the media or to the left to rewind the media. In some examples, the control interface receives input selecting a particular media segment and dragging the particular media segment to a new location within the sequence of media segments of region 224 to reorder media segments 108-132. In some instance, the particular media segment move to the selected location within the sequence of media segments 108-132. In other instances, the particular media replaces the media segment at the location within the sequence of media segments 108-132 of region 224.

Control interface includes a dynamic media renderer that presents a portion of the media during scrubbing while preventing the presentation from delaying further scrubbing. Scrubbing occurs when control interface receives input proximate to progress bar 212 a new location within progress bar 212. Dynamic media renderer renders frames of the media during scrubbing enabling a user to see one or more frames of the media when at a location within the progress bar. When control interface receives continuous input from a first location of progress bar 212 to a second location of progress bar 212, to a third location of progress bar 212, the control interface waits for dynamic media renderer to return a frame of the media corresponding to the second location of progress bar 212 when the input is received corresponding to the third location of progress bar 212. In some instances, the control interface interrupts the dynamic media renderer before dynamic media renderer can finish rendering the frame for the second location of progress bar 212 and executes a new request for a frame at the third location of progress bar 212. Implementing the interrupt takes time and uses processing resources of the media editing system to execute commands to pause execution of the dynamic media renderer identify and prepare the dynamic media renderer for execution of a new rendering process. The time used to implement the interrupt is longer than the time to wait for the dynamic media renderer to finish rendering the frame of the media corresponding to the second location of progress bar 212. When scrubbing through multiple locations of progress bar 212, the control interface waits to obtain the frame from the dynamic media renderer even when a new location of progress bar 212 has already been selected. The control interface does not show the fame because the control interface already received a new location of progress bar 212. In some examples, the control interface discards the frame. In other instances, the control interface stores the frame in memory (e.g., cache memory, random access memory, and/or non-volatile memory, etc.) for future use.

For example, the input is a selection and hold (e.g., such as a finger press on a touch interface, followed by a drag along the touch interface from a first location to a second location) or a touch. If the input is a touch and hold, the control interface executes a call to dynamic media renderer when the input causes segment 210 to be positioned over a different portion of progress bar 212. Dynamic media renderer then executes one or more rendering operations to render a frame of the media at the different portion of progress bar 212. The dynamic media renderer then returns a representation of the frame for presentation within display 204 or as a thumbnail just above progress bar 212. If the input is continuous (e.g., the finger is dragged to a new location of progress bar 212 without disconnecting from the touch interface) and shifts to a new location of progress bar 212 before dynamic media renderer returns with the frame, then control interface waits for the frame from dynamic media renderer, delete the frame, and execute a new call to dynamic media renderer for a new frame of the media corresponding to the new location of progress bar 212. The control interface does not interrupt the dynamic media renderer when the input continues to a new location of progress bar 212, but instead waits for dynamic media renderer to complete the operation before executing a new command. By waiting for dynamic media renderer to complete the operation and discarding the output, the control interface access frames of the media during scrubbing much faster than if the dynamic media renderer is terminated. When control interface detects that the input is terminated (e.g., the finger is disconnected from the touch interface, etc.) the dynamic media renderer begins rendering the media at the location of the media corresponding to the location of the progress bar in which the input terminated.

Control interface includes a control over display 204 or proximate to display 204 that when selected provides a list of editing operations. The list of editing operations include a graphical layer that enables adding one or more graphical elements over a portion of the media segment. In some examples, the control interface presents the graphical element over the entire presentation length of the media segment, over a particular time interval of the presentation length, or over the entire presentation length of the media. The control interface places the graphical element onto the image by receiving input dragging the graphical element from the list to a location over display 204. In some examples, the control interface resizes or rotates the graphical element based on a single touch gesture. For instance, the user selects an edit location positioned on or proximate to the graphical element using a finger on a touch interface. The user then moves the finger away from the graphical element to increase a size of the graphical element or moves the finger towards the edit location to decrease the size of the graphical element. While resizing the graphical element, the user moves the finger 360 degrees around the edit point causing the graphical element to rotate accordingly. When the finger disconnects from the surface of the touch interface, the resizing and rotation is saved. The control interface enables just resizing the graphical element, just rotating the graphical element, or rotating and resizing the graphical element in a single gesture.

Region 220 of the control interface includes an element hierarchy providing a graphical representation of elements and/or effects added to the media or modifications to the media. For instance, when elements (e.g., graphical elements, animations, audio segments, etc.) are added to the media, control interface expands region 220, the space between display 204 and progress bar 212. Region 220 presents a representation of elements added to the media such as elements 232-244. The control interface positions the representation of the elements relative to the icons of media segments 108-132 to indicate the position of the elements within the media. For instance, musical element 232 extends over the length of progress bar 212 indicating the element is presented is presented over the entire presentation length of the media. The representation of graphical element 236 is presented over a portion of media segment 108 indicating that graphical element 236 is presented during that portion of media segment 108. The representation of graphical element 244 overlaps the representation of graphical element 236 indicating graphical element 244 is presented at the same time as graphical element 236 for at least a portion of the presentation length of media segment 108.

The control interface presents elements of region 220 in a particular orientation or color based on the element type. For instance, the control interface presents elements representing audio segments such as music, etc. above elements representing graphics. The control interface presents elements representing graphics above elements representing effects. The control interface presents elements representing effects above elements representing modifications to the media or media segments. Alternatively, control interface presents elements in the opposite order with elements representing audio segments presented below elements representing graphics, etc. In addition, the control interface accepts input to rearrange the order of element types. In some examples, the control interface presents each element type using a particular color and/or texture.

Control interface includes controls that modify editing operations applied to the media segments 108-132. For instance, some editing operations impact some media segments differently than other media segments based on features of the media segments such as presentation length. A zoom effect applied to an image media segment, for instance, zooms into the image media segment from an initial representation of the image media segment to a final zoomed-in representation of the image. The rate of the zoom effect is based on the presentation length of the media segment causing some media segments, such as media segment 120 and media segment 132 to zoom at a higher rate than other media segments such as media segment 124 and media segment 112 due to the differences in presentation length between media segment 120 and media segment 124. The disparate impact of the editing operations affects the presentation of the overall media. Control interface includes controls that scale the editing operations as applied to particular media segments relative to other media segments and/or the media as a whole to normalize the appearance of the media segments during presentation of the overall media.

In some examples, control interface includes a representation of modifications to media segments as an element within region 220 and a representation of modifications to editing operations that modify media segments. For instance, control interface adds an editing operation element to the elements presented in region 220. The control interface represents the editing operation element using a particular color or texture that corresponds to editing operations. In some instances, if an editing operation is modified for a particular media segment, the control interface modifies the appearance of that editing operation element within region 220 so that the modified editing operation is easy to distinguish from non-modified editing operations. In some examples, the control interface modifies the appearance based on the degree of modification to the editing operation. For instance, an editing operation element representing a modification to a zoom effect applied to media segment 120 uses a different color and/or texture, a brighter color and/or texture, a darker color and/or texture, etc. than the representation of an editing operation element representing a modification to a zoom effect applied to media segment 128. Any color and/or texture may be used for an element to represent an editing operation, and any color and/or texture may be used to indicate a modification to an editing operation.

Figure 3:
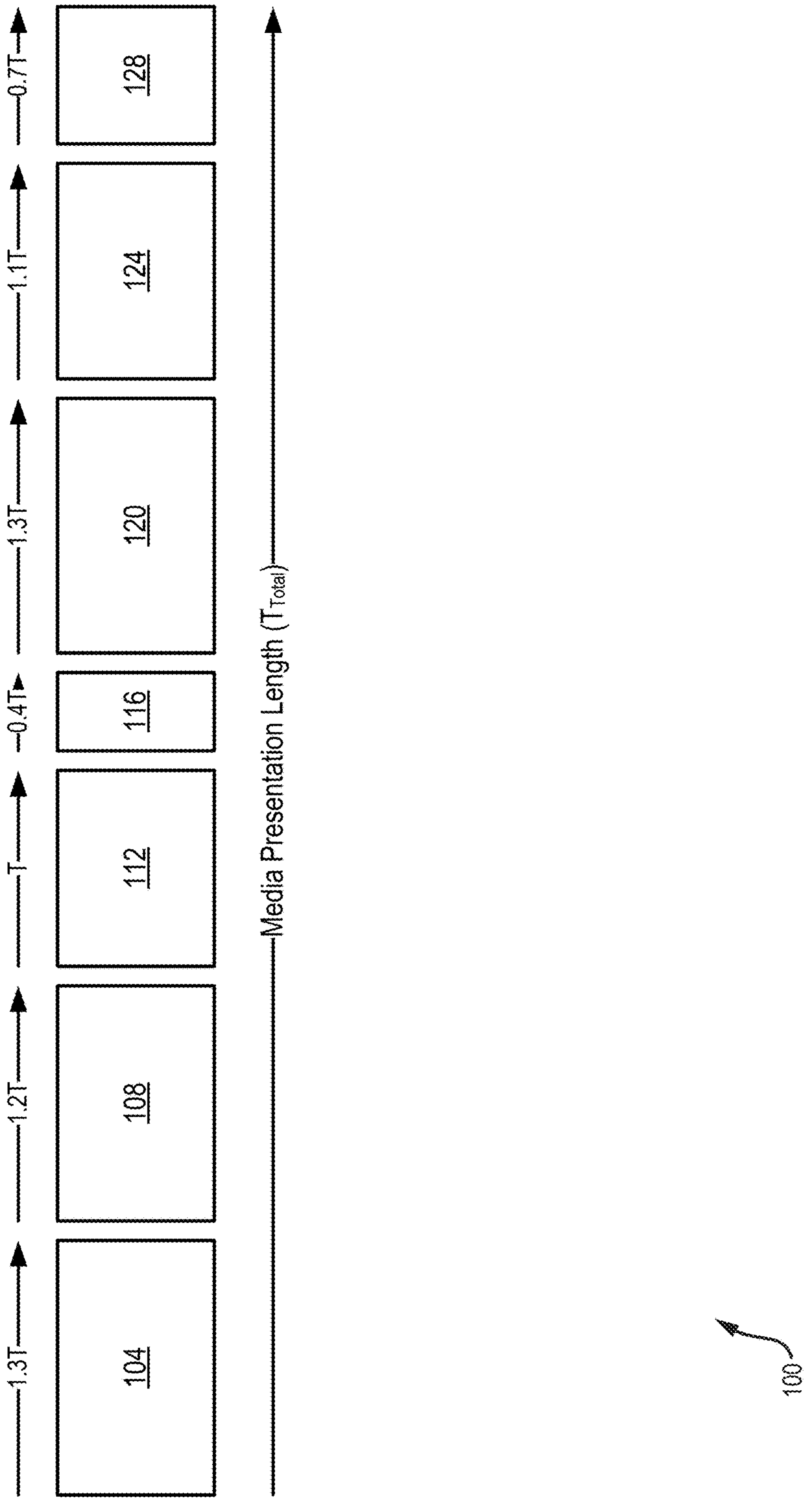
FIG. 3 illustrates a block diagram of an example of feature normalization for scaling editing operations of a media editing system according to aspects of the present disclosure.

FIG. 3 illustrates a block diagram of an example of feature normalization for scaling editing operations of a media editing system according to aspects of the present disclosure. A media editing system generates new media from one or more media segments. The media editing system executes editing operations on the media segment to improve the appearance and presentation of the media segments. Since each media segments includes different characteristics, execution of the editing operations impacts the media segments differently. The media editing system defines scaling parameters that normalize the editing operations of the media editing system. Once normalized, the editing operations impact each media segment similarly to further improve the appearance and presentation of the media output by the media editing system.

The media editing system extracts features from the media segments. The media editing system also extracts features from the media as a whole. The features correspond to characteristics of a media segment and/or the media as a whole. The media editing system defines relationships between the features of one media segment relative to features of one or more other media segments. Alternatively, or additionally, the media editing system defines relationships between the features of one media segment relative to features of the media as a whole. For instance, the media editing system extracts a presentation length (Time, $T_n$, wherein n represent a particular media segment within a sequence of media segments of the media) of each media segment and the presentation length of the media as a whole (Time–$T_{total}$). The media editing system then defines a relationship between the presentation length of a media segment (e.g., $T_n$) and the presentation length of one or more other media segments (e.g., $T_{n-1}$, $T_{n+1}$, etc.). Alternatively, or additionally, the media editing system then defines a relationship between the presentation length of a media segment (e.g., $T_n$) and the presentation length of the media as a whole ($T_{total}$). Alternatively, or additionally, the media editing system then defines a relationship between the presentation length of a media segment (e.g., $T_n$) and an average presentation length ($T_{avg}$ derived by adding up the presentation lengths of each media segment and dividing by the quantity of media segments, etc.).

For example, the media editing system an average presentation length of the set of media segments that make up media generated by the media editing system designated as T. The media editing system then expresses the presentation length of each media segment relative to the average presentation time, T. In the example set of media segments 104-128, the presentation length of media segment 112 is represented at T because the presentation length is equal to the average presentation length. The presentation length of media segment 116 40% of the average presentation length and is represented as 0.4T. The presentation length of media segment 104 is 30% larger than the overage and is represented as 1.3T. The media editing system may use other features and/or relationships to derive the relationship of a feature of a media segment relative to features of other media segments or the media as a whole.

The media editing system defines scaling parameters for a media segment based on a feature relative to the feature of one or more other media segments or the media as a whole. For example, the scaling parameter for presentation length for media segment 112 is T and the scaling parameter for media segment 116 is 0.4T. In other examples, the scaling parameter is a value derived from the feature relative to the feature of one or more other media segments or the media as a whole (e.g., such T for media segment 112 and 0.4T for media segment 116 of the previous example).

The media editing system uses the scaling parameter to scale an editing operation related to the feature of the scaling parameter. An editing operation, such as an editing operation that add a zoom effect to a static image to add motion (e.g., animation) to the static image, operates on media segments of different presentation length differently. The editing operation defines a translation of the image (e.g., a zoomed-in representation of the initial image or a zoomed-out representation of the initial image) and a series of transitions between an initial image and the translation of the image (e.g., a step representation of the image between the initial image and the translation). During rendering, the media editing system presents the series of transitions regardless of the presentation length of the media segment. This means that for shorter media segments, the media editing system presents the series of transitions over a shorter time interval causing the effect of the editing operation to appear faster. For media segments less than T, the media editing system scales the translation to a less zoomed in representation of the initial image or a less zoomed out representation of the initial image so that there are fewer transitions. For media segments greater than T, the media editing system scales the translation to a greater zoomed in representation of the initial image or a greater zoomed out representation of the initial image so that there are more transitions for shorter media segments. Once scaled, the media editing system applies the scaled editing operation causing the zoom effect to operate at a same rate across each media segment regardless of the presentation length of individual media segments.

Although the example of FIG. 3 uses presentation length to illustrate the scaling of editing operations, the media editing system scales other editing operations based on other features of the media segments. For example, the media editing system scales color editing operations (e.g., an editing operation that modifies colors of a media segment such color correction, etc.) by defining one or more color features of the media segment, defining a scaling parameter by determining a relationship between the one or more color features and one or more average color features, and scaling the modifications applied by the color editing operation based on the relationship. The scaled color editing operation causes colors of the media segments to more distinct from the average or less distinct from the average so that transitions between media segments appear to stand out or appear smoother respectively.

Figure 4:
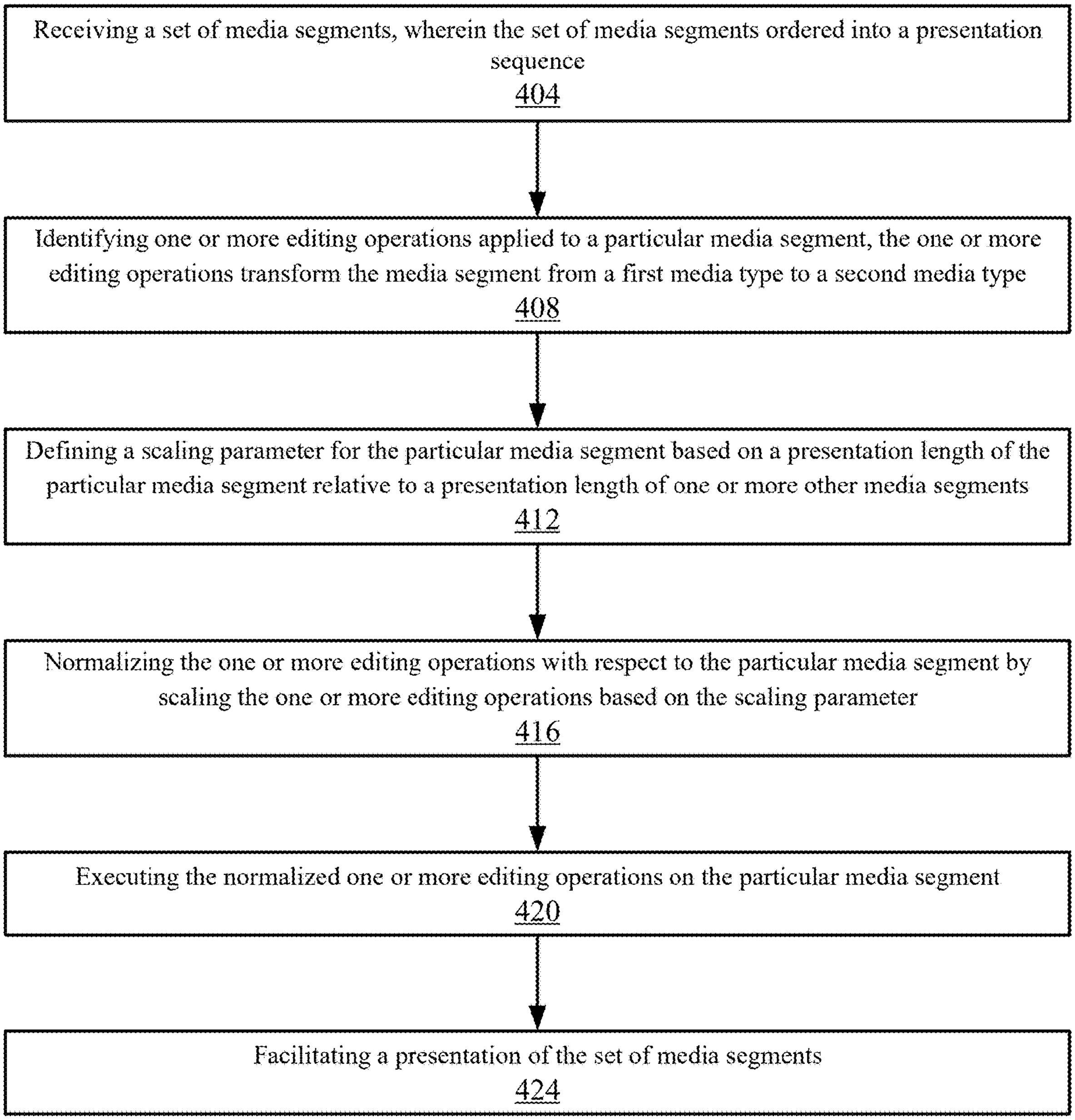
FIG. 4 illustrates a flowchart of an example process for dynamically scaling editing operations of a media editing system according to aspects of the present disclosure.

FIG. 4 illustrates a flowchart of an example process for dynamically scaling editing operations of a media editing system according to aspects of the present disclosure. A media editing system executes on a computing device (e.g., such as a personal computer, server, mobile device such as a smartphone or tablet, or the like) to generate and manage media. At block 404, the media editing system receives a set of media segments. The set of media segments are ordered into a presentation sequence. A media segment includes an image, a video segment, an audio segment, combinations thereof, and/or the like. In some examples, the media editing system receives one or more media segments from components of the computing device such as a camera, volatile or non-volatile memory, or the like. In some examples, the media editing system receives one or more media segments from one or more remote devices over a network. The media editing system receives the set of media segments as part of a request to generate or process media composed of the set of media segments. For instance, upon receiving a request to generate media, the media editing system receives the set of media segments to be included in the media. The media editing system receives media segments at once, individually, or in batches. For instance, media editing system receives one or more media segments with the request to generate the media. In another example, media editing system receives one or more media segments with the request to generate the media and one or more media segments from a camera of the computing device before and/or after receiving the one or more segments with the request to generate the media.

At block 408, the media editing system identifies one or more editing operations applied to a particular media segment. The one or more editing operations transform the media segment from a first media type to a second media type. In some examples, the first media type of the particular media segment is an image. The one or more editing operations transform the image into a second media type by configuring the media to present the image over a time interval similar to a video segment. In some examples, the one or more editing operations also transform the static representation of the image within the media into a dynamic representation of the image by adding motion through a zoom-in or zoom-out effect (e.g., where the presentation of the image zooms-in or zooms-out, etc.). In other examples, the one or more editing operations that transform the static representation of the image within the media into the dynamic representation of the image are applied at block 420. In some instances, the media editing system includes other processing operations with the one or more editing operations such as, but not limited to, operations that reorder the media segments of the set of media segments, add an audio segment to the set of media segments such as music, define transition conditions that determine when a media segments transitions to a next media segment such as on a beat of music, define a presentation length of media segments such as based on one or more transition conditions, perform color and/or contrast correction, upscale or downscale a resolution of media segments, increase or decrease a frame rate of a media segments, combinations thereof, and/or the like.

For example, a media editing system defines media including a set of media segments and a transition condition based on a feature of music presented with the media. Each time the media editing system adds a new media segment to the set of media segments or changes the music, the one or more editing operations update the presentation length of the set of media segments according to the transition condition.

At block 412, the media editing system defines a scaling parameter for the particular media segment based on a presentation length of the particular media segment relative to a presentation length of one or more other media segments. The media editing system extracts features from the set of media segments. The features correspond to characteristics of the media segments such as, but not limited to, a presentation length, color information (e.g., average pixel color, average frame pixel color per frame, color frequency, etc.), frequency information (e.g., such as audio frequency information, etc.), a source of a media segment (e.g., a device that captured or generated the media segment), a geolocation of where the media segment was captured or generated, user information, a resolution of the media segment, a frame rate of the media segment, refresh rate of the media segment, an identification of operations executed on the media segment, and/or the like. The media editing system then represents one or more features of a media segment relative to corresponding features (e.g., features representing the same or similar characteristics, etc.) of one or more media segments of the set of media segment and/or all of the media segments. For instance, the media editing system derives an average presentation length of the set of media segments and expresses the presentation length of each media segment relative to the average presentation length.

The media editing system defines the scaling value for a feature as the feature relative to the corresponding features of media segments of the set of media segments. Using presentation length as an example, the media editing system defines the scaling parameters as the presentation length of the particular media segment relative to the average presentation length. Alternatively, the media editing system defines the scaling parameters as the presentation length of the particular media segment relative to the presentation length of one or more proximate media segments in the presentation sequence. The media editing system defines a scaling parameter for the features that impact how an editing operation effects a media segment once applied such as presentation length. In some examples, the media editing system defines scaling parameters for other features that impact editing operations.

At block 416, the media editing system normalizes the one or more editing operations with respect to the particular media segment by scaling the one or more editing operations based on the scaling parameter. The one or more editing operations include a particular editing operation that transforms a static representation of an image into a dynamic representation of an image by adding a zoom effect. The particular editing operation defines one or more translations of the particular media segment (e.g., a zoomed-in representation or a zoomed-out representation) with a series of transitions between the initial representation of the particular media segment and a of the one or more translations and (for when there are more than one translations) a series of transitions between each translation. The series of transitions define step presentations between initial representation and the translation (or between translations).

The media editing system normalizes the particular editing operation by modifying the translation defined by the particular editing operation to reduce the quantity of transitions causing the zoom-in or zoom-out effect to appear slower over the presentation length of the particular media segment or increase the quantity of transitions causing the zoom-in or zoom-out effect to appear faster over the presentation length of the particular media segment. Since the scaling parameter is expressed relative to other media segments of the set of media segments, normalizing the particular editing operation causes the editing operation to impact the particular media segment in similarly or the same as the other media segments.

At block 420, the media editing system executes the one or more normalized editing operation on the particular media segment. By executing the editing operation, the media editing system normalizes a presentation of the particular media segment relative to other media segments of the set of media segments improving the appearance of the media and the presentation of the media. In some examples, the media editing system re-executes each editing operation executed at block 408. In other examples, the media editing system executes editing operations normalized at block 416.

At block 424, the media editing system facilitates a presentation of the set of media segments. For instances, the media editing system presents the set of media segments via a display of the computing device. In another example, the media editing system outputs the set of media segments to another display device or computing device for presentation. In still yet other examples, the media editing system stores the set of media segments in memory of the computing device or accessible to the computing device. A media player accesses the set of media segments in memory and presents the set of media segments.

Figure 5:
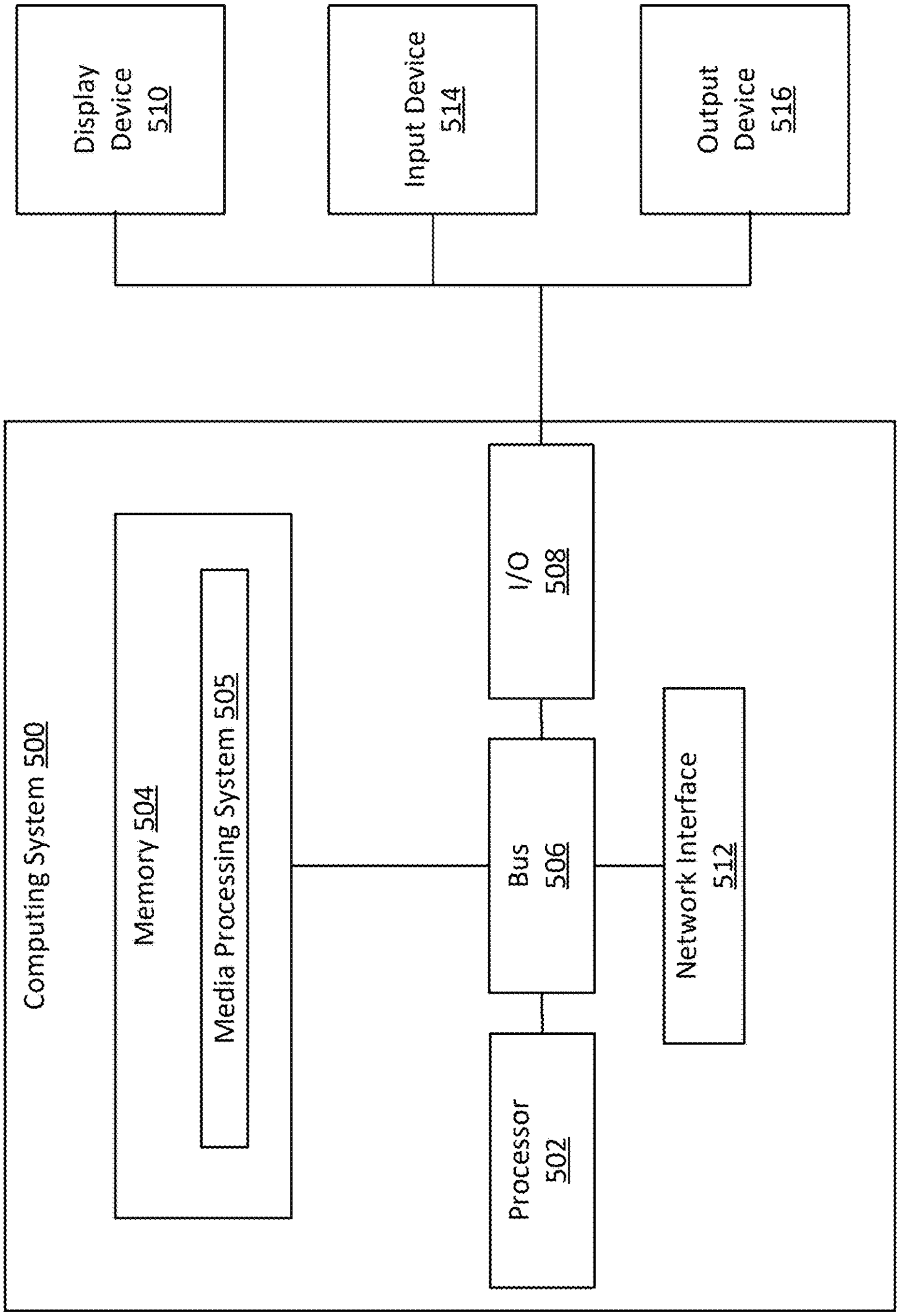
FIG. 5 illustrates an example computing device architecture of an example computing device that can implement the various techniques described herein according to aspects of the present disclosure.

Any suitable computing system or group of computing systems can be used for performing the operations described herein. For example, FIG. 5 depicts a computing system 500 that can implement any of the computing systems or environments discussed above. In some embodiments, the computing system 500 includes a processing device 502 that executes the media processing system, a memory that stores various data computed or used by the media processing system, an input device 514 (e.g., a mouse, a stylus, a touchpad, a touch-screen, etc.), and an output device 516 that presents output to a user (e.g., a display device that displays graphical content generated by media processing system). For illustrative purposes, FIG. 5 depicts a single computing system on which the media processing system is executed, and the input device 514 and output device 516 are present. But these applications, datasets, and devices can be stored or included across different computing systems having devices similar to the devices depicted in FIG. 5.

The example of FIG. 5 includes a processing device 502 communicatively coupled to one or more memory devices 504. The processing device 502 executes computer-executable program code stored in a memory device 504, accesses information stored in the memory device 504, or both. Examples of the processing device 502 include a microprocessor, an application-specific integrated circuit ("ASIC"), a field-programmable gate array ("FPGA"), or any other suitable processing device. The processing device 502 can include any number of processing devices, including a single processing device.

The memory device 504 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions could include processor-specific instructions generated by a compiler or an interpreter from code written in any suitable computer-programming language, including, for example, C, C++, C #, Visual Basic, Java, Python, Perl, JavaScript, and ActionScript.

The computing system 500 could also include a number of external or internal devices, such as a display device 510, or other input or output devices. For example, the computing system 500 is shown with one or more input/output ("I/O") interfaces 508. An I/O interface 508 can receive input from input devices or provide output to output devices. One or more buses 506 are also included in the computing system 500. Each bus 506 communicatively couples one or more components of the computing system 500 to each other or to an external component.

The computing system 500 executes program code that configures the processing device 502 to perform one or more of the operations described herein. The program code includes, for example, code implementing the document-processing application 102 or other suitable applications that perform one or more operations described herein. The program code can be resident in the memory device 504 or any suitable computer-readable medium and can be executed by the processing device 502 or any other suitable processor. In some embodiments, all modules in the media processing system are stored in the memory device 504, as depicted in FIG. 5. In additional or alternative embodiments, one or more of these modules from the media processing system are stored in different memory devices of different computing systems.

In some embodiments, the computing system 500 also includes a network interface device 512. The network interface device 512 includes any device or group of devices suitable for establishing a wired or wireless data connection to one or more data networks. Non-limiting examples of the network interface device 512 include an Ethernet network adapter, a modem, and/or the like. The computing system 500 is able to communicate with one or more other computing devices (e.g., a computing device that receives inputs for document-processing application 102 or displays outputs of the document-processing application 102) via a data network using the network interface device 512.

An input device 514 can include any device or group of devices suitable for receiving visual, auditory, or other suitable input that controls or affects the operations of the processing device 502. Non-limiting examples of the input device 514 include a touchscreen, stylus, a mouse, a keyboard, a microphone, a separate mobile computing device, etc. An output device 516 can include any device or group of devices suitable for providing visual, auditory, or other suitable sensory output. Non-limiting examples of the output device 516 include a touchscreen, a monitor, a separate mobile computing device, etc.

Although FIG. 5 depicts the input device 514 and the output device 516 as being local to the computing device that executes the document-processing application 102, other implementations are possible. For instance, in some embodiments, one or more of the input device 514 and the output device 516 include a remote client-computing device that communicates with the computing system 500 via the network interface device 512 using one or more data networks described herein.

The following examples illustrate various aspects of the present disclosure. As used below, any reference to a series of examples is to be understood as a reference to each of those examples disjunctively (e.g., "Examples 1-4" is to be understood as "Examples 1, 2, 4, or 4").

Example 1 is a method comprising: receiving a set of media segments, wherein the set of media segments ordered into a presentation sequence; identifying one or more editing operations applied to a particular media segment, the one or more editing operations transform the media segment from a first media type to a second media type; defining a scaling parameter for the particular media segment based on a presentation length of the particular media segment relative to a presentation length of one or more other media segments; normalizing the one or more editing operations with respect to the particular media segment by scaling the one or more editing operations based on the scaling parameter; executing the normalized one or more editing operations on the particular media segment; and facilitating a presentation of the set of media segments.

Example 2 is the method of any of example(s) 1 and 3-7, wherein the one or more editing operations include at least one of a translation operation or a zoom operation.

Example 3 is the method of any of example(s) 1-2 and 4-7, wherein the one or more other media segments are proximate to the particular media segment in the presentation sequence.

Example 4 is the method of any of example(s) 1-3 and 5-7, wherein scaling the one or more editing operations is further based on an average presentation length of the set of media segments.

Example 5 is the method of any of example(s) 1-4 and 6-7, wherein the first media type is an image and the second media type includes an animated representation of the image.

Example 6 is the method of any of example(s) 1-5 and 7, wherein the presentation length of the particular media segment is shorter than an average presentation length of the one or more other media segments.

Example 7 is the method of any of example(s) 1-6, wherein scaling the one or more editing operations includes: modifying a translation of the particular media segment, which reduces a quantity of transitions between a first frame of the particular media segment and a last frame of the particular media segment.

Example 8 is a system comprising: one or more processors; and a non-transitory computer-readable medium storing instructions that when executed by the one or more processors, cause the one or more processors to perform any of Examples 1-7:

Example 9 is a non-transitory computer-readable medium storing instructions that when executed by one or more processors, cause the one or more processors to perform any of Examples 1-7.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description.

It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The invention claimed is:

1. A method comprising:
 receiving a set of media segments, wherein the set of media segments ordered into a presentation sequence;
 identifying one or more editing operations applied to a particular media segment, the one or more editing operations transform the particular media segment from a first media type to a second media type;
 defining a scaling parameter for the particular media segment based on a presentation length of the particular media segment relative to a presentation length of one or more other media segments;
 normalizing the one or more editing operations with respect to the particular media segment by scaling the one or more editing operations based on the scaling parameter;
 executing the normalized one or more editing operations on the particular media segment; and
 facilitating a presentation of the set of media segments.

2. The method of claim 1, wherein the one or more editing operations include at least one of a translation operation or a zoom operation.

3. The method of claim 1, wherein the one or more other media segments are proximate to the particular media segment in the presentation sequence.

4. The method of claim 1, wherein scaling the one or more editing operations is further based on an average presentation length of the set of media segments.

5. The method of claim 1, wherein the first media type is an image and the second media type includes an animated representation of the image.

6. The method of claim 1, wherein the presentation length of the particular media segment is shorter than an average presentation length of the one or more other media segments.

7. The method of claim 1, wherein scaling the one or more editing operations includes:
 modifying a translation of the particular media segment, which reduces a quantity of transitions between a first frame of the particular media segment and a last frame of the particular media segment.

8. A system comprising:
 one or more processors; and
 a non-transitory computer-readable medium storing instructions that when executed by the one or more processors, cause the one or more processors to perform operations including:
  receiving a set of media segments, wherein the set of media segments ordered into a presentation sequence;
  defining a presentation length for each media segment of the set of media segments based on a media segment presented in parallel to the set of media segments;
  defining a scaling parameter for a particular media segment of the set of media segments based on a presentation length of the particular media segment relative to a presentation length of one or more other media segments;
  normalizing one or more editing operations with respect to the particular media segment by scaling the one or more editing operations based on the scaling parameter; and
  executing the normalized one or more editing operations on the particular media segment to normalize an appearance of the particular media segment relative to the one or more other media segments.

9. The system of claim 8, wherein the one or more editing operations include at least one of a translation operation or a zoom operation.

10. The system of claim 8, wherein the one or more other media segments are proximate to the particular media segment in the presentation sequence.

11. The system of claim 8, wherein scaling the one or more editing operations is further based on an average presentation length of the set of media segments.

12. The system of claim 8, wherein the particular media segment is an image presented for a time interval corresponding to the presentation length of the particular media segment.

13. The system of claim 8, wherein the presentation length of the particular media segment is shorter than an average presentation length of the one or more other media segments.

14. The system of claim 8, wherein scaling the one or more editing operations includes:
 modifying a translation of the particular media segment, which reduces a quantity of transitions between a first frame of the particular media segment and a last frame of the particular media segment.

15. A non-transitory computer-readable medium storing instructions that when executed by one or more processors, cause the one or more processors to perform operations including:
 identifying one or more editing operations applied to a particular media segment of a set of media segments;
 defining a scaling parameter for the particular media segment based on a feature of the particular media segment relative to a corresponding feature of one or more other media segments;
 normalizing the one or more editing operations with respect to the particular media segment by scaling the one or more editing operations based on the scaling parameter; and
 executing the normalized one or more editing operations on the particular media segment.

16. The non-transitory computer-readable medium of claim 15, wherein the one or more editing operations include at least one of a translation operation or a zoom operation.

17. The non-transitory computer-readable medium of claim 15, wherein scaling the one or more editing operations is further based on an average presentation length of the set of media segments.

18. The non-transitory computer-readable medium of claim 15, wherein the feature of the particular media segment corresponds to a presentation length of the particular media segment.

19. The non-transitory computer-readable medium of claim 15, wherein a presentation length of the particular media segment is shorter than an average presentation length of the one or more other media segments.

20. The non-transitory computer-readable medium of claim 15, wherein scaling the one or more editing operations includes:

modifying a translation of the particular media segment, which reduces a quantity of transitions between a first frame of the particular media segment and a last frame of the particular media segment.

* * * * *